United States Patent [19]
Desmons

[11] Patent Number: 5,150,442
[45] Date of Patent: Sep. 22, 1992

[54] COMBINED ELECTRIC/OPTIC CABLE AND APPLICATION THEREOF TO THE LINK BETWEEN A CAMERA HEAD AND A CONTROL UNIT

[75] Inventor: Gérard Desmons, Clichy, France

[73] Assignee: Thomson Video Equipement, Cergy Saint Christophe, France

[21] Appl. No.: 668,174

[22] Filed: Mar. 12, 1991

[30] Foreign Application Priority Data

Mar. 27, 1990 [FR] France .................. 90 03876

[51] Int. Cl.⁵ .................................. G02B 6/44
[52] U.S. Cl. .................... 385/101; 174/70 R; 174/103
[58] Field of Search ............ 350/96.10, 96.23; 174/70 R, 103, 104, 105 R; 385/100, 101, 102

[56] References Cited

U.S. PATENT DOCUMENTS

| 4,158,478 | 6/1979 | D'Auria et al. | 350/96.23 |
| 4,695,127 | 9/1987 | Ohlhaber et al. | 350/96.23 |
| 4,763,981 | 8/1988 | Wilkins | 350/96.23 |
| 4,896,939 | 1/1990 | O'Brien | 350/96.23 |
| 5,042,903 | 8/1991 | Jakubowski | 385/101 |

FOREIGN PATENT DOCUMENTS

| 6364 | 1/1980 | European Pat. Off. |
| 3733747 | 4/1989 | Fed. Rep. of Germany |
| 1172272 | 11/1969 | United Kingdom |

*Primary Examiner*—John D. Lee
*Attorney, Agent, or Firm*—Oblon, Spivak, McClelland, maier & Neustadt

[57] ABSTRACT

A combined electric/optic cable has a triaxial cable having, along one and the same central axis, three imbricated, concentric, tubular, electric conductors and a central optic fiber. The present invention may find particular application in high definition television systems.

9 Claims, 2 Drawing Sheets

COMBINED ELECTRIC/OPTIC CABLE AND APPLICATION THEREOF TO THE LINK BETWEEN A CAMERA HEAD AND A CONTROL UNIT

BACKGROUND OF THE INVENTION

1. Field of the Invention

The present invention pertains notably to a combined electric and optic cable for applications relating notably to high definition television (HDTV). The invention also relates to an application of the combined cable to the link between a camera head and a control unit.

2. Description of the Prior Art

A standard way of connecting a camera head to a control unit is to use an electric triaxial cable, namely a shielded coaxial cable This cable has the following characteristics:

- it is designed to transmit all the video signals as well as the service signals, such as the audio, interphone, remote control and servocontrol signals, by frequency division multiplexing on the internal coaxial structure: each signal to be transmitted modulates a different carrier frequency. These carrier frequencies are multiplexed and the resulting complex signal is conveyed on the internal coaxial structure of the triaxial cable;
- it transmits the supply of the camera head;
- it transmits particular service signals, known as "back-up operation" signals, used when the equipment is not in normal operation;
- it enables the grounding of the camera head by an external conductive braid which also serves as a shielding for the cable. The range of this type of cable is great (typically 1 to 1.5 km). However, a standard triaxial cable such a this attenuates the high frequency signals far too excessively to enable the transmission of high definition television signals; the typical degree of attenuation is 3.9 dB for 100 m of cable at 60 MHz. Now, for high definition television, the passbands of the video signals to be transmitted are far bigger than for the presently used television signals. The passbands are typically equal to 30 MHz or even 60 MHz instead of 5 MHz as at present. Furthermore, if the signals are digitalized and transmitted digitally, the bit rate of the binary information in series is far greater: it is greater than 1 Gbit.

There are also cables with optic fibers only. These cables are used for cable networks. However, they have no electrical conductor for the supply, the back-up signals and the grounding. They are therefore not appropriate for high definition television applications.

There are also multiple-conductor applications that have been used in the past for certain cameras. A link achieved by a cable such as this is bidirectional and each signal to be transmitted is conveyed by a different conductor. However, their technology is dated. They have a small range (300 to 600 m); they are brittle and unreliable, and take up a substantial amount of space.

Finally, there are combined coaxial/optic fiber cables used for sonars. In these cables, the insulator of the coaxial cable is grooved to insert optic fibers. These combined cables may include up to ten optic fibers. However, their structure is not suited to the applications envisaged because it is not rotationally symmetrical and is very similar to the structure of multiple-conductor cables.

SUMMARY OF THE INVENTION

The most appropriate structure to transmit high definition television signals is a triaxial structure because it is very sturdy; it has the advantage of being almost universal and enables the transmission of the supply, the back-up service signals and the grounding. However, to resolve the problems of the attenuation of the high frequency signals in the standard triaxial cables, the use of an optic fiber is particularly appropriate because its passband is very wide and the attenuation of signals in the fiber is negligible. The invention therefore relates to a cable having a combined electrical/optic structure, the electrical part of which is of the triaxial type and is formed by conductors to transmit the supply, the back-up service signals and the earthing signals, and the optic fiber of which is formed by a central optic fiber to transmit the wideband video signals as well as the video, interphone, remote control and servo-control signals.

According to the invention, there is proposed a combined electrical/optic cable for the transmission of television signals, having a rotationally symmetrical structure and comprising, along one and the same central axis and protected by an external sheath, at least three imbricated, concentric, tubular structures, C1, C2, C3, separated by insulator tubes, the conductor C3 being designed to be grounded, and one central optic fiber with the same axis designed to transmit video signals.

Another object of the invention is the application of a combined electric/optic cable to the link between a camera head and a control unit.

BRIEF DESCRIPTION OF THE DRAWINGS

Other particular features and advantages of the invention will appear from the following description, made on a non-restrictive basis, with reference to the appended figures, of which.

DESCRIPTION OF THE PREFERRED EMBODIMENT

Figure 1:
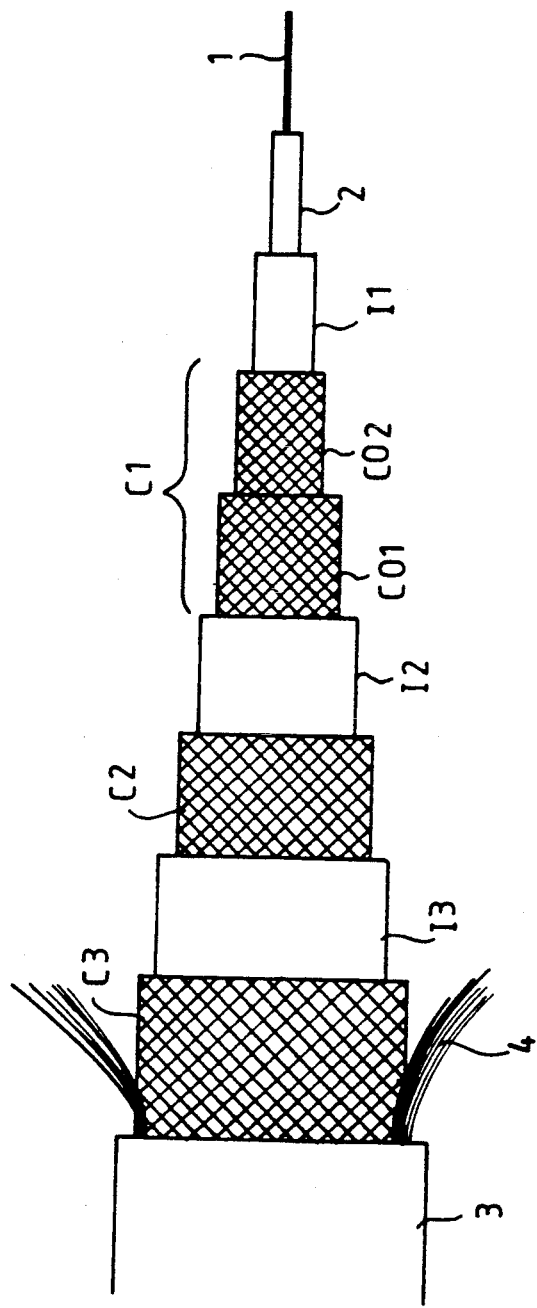
FIG. 1 shows a sectional view of an example of a combined electric/optic cable according to the invention.

FIG. 1 shows a sectional view of a combined electric/optic cable according to the invention. This cable has a rotationally symmetrical structure. Along a central axis, at the center, this cable has an optic fiber 1 provided with a protective sheath 2, for example a polyester tube. Around this central optic fiber, the combined cable of FIG. 1 has three imbricated, concentric, tubular electric conductors, C1, C2, C3. Insulator tubes I1, I2, I3 respectively separate the conductor C1 from the sheath 2 of the optic fiber, the conductor C1 from the conductor C2 and the conductor C2 from the conductor C3. An external sheath 3 protects the entire structure. The conductor C1 is formed by two conductors CO1 and CO2 placed one on top of the other to reduce the resistance of the cable by increasing its section in order to reduce supply losses and improve the range of the cable. But the use of only one conductor instead of the two conductors CO1 and CO2 is possible, without going beyond the scope of the invention. The conductors C1 and C2 form an matched coaxial structure. The external conductor C3 enables a grounding and the shielding of the cable in order to meet electrical safety standards. A reinforcement piece 4, located between the conductor C3 and the external sheath 3, made of Kevlar for example, reinforces the mechanical resistance of the cable.

Figure 2:
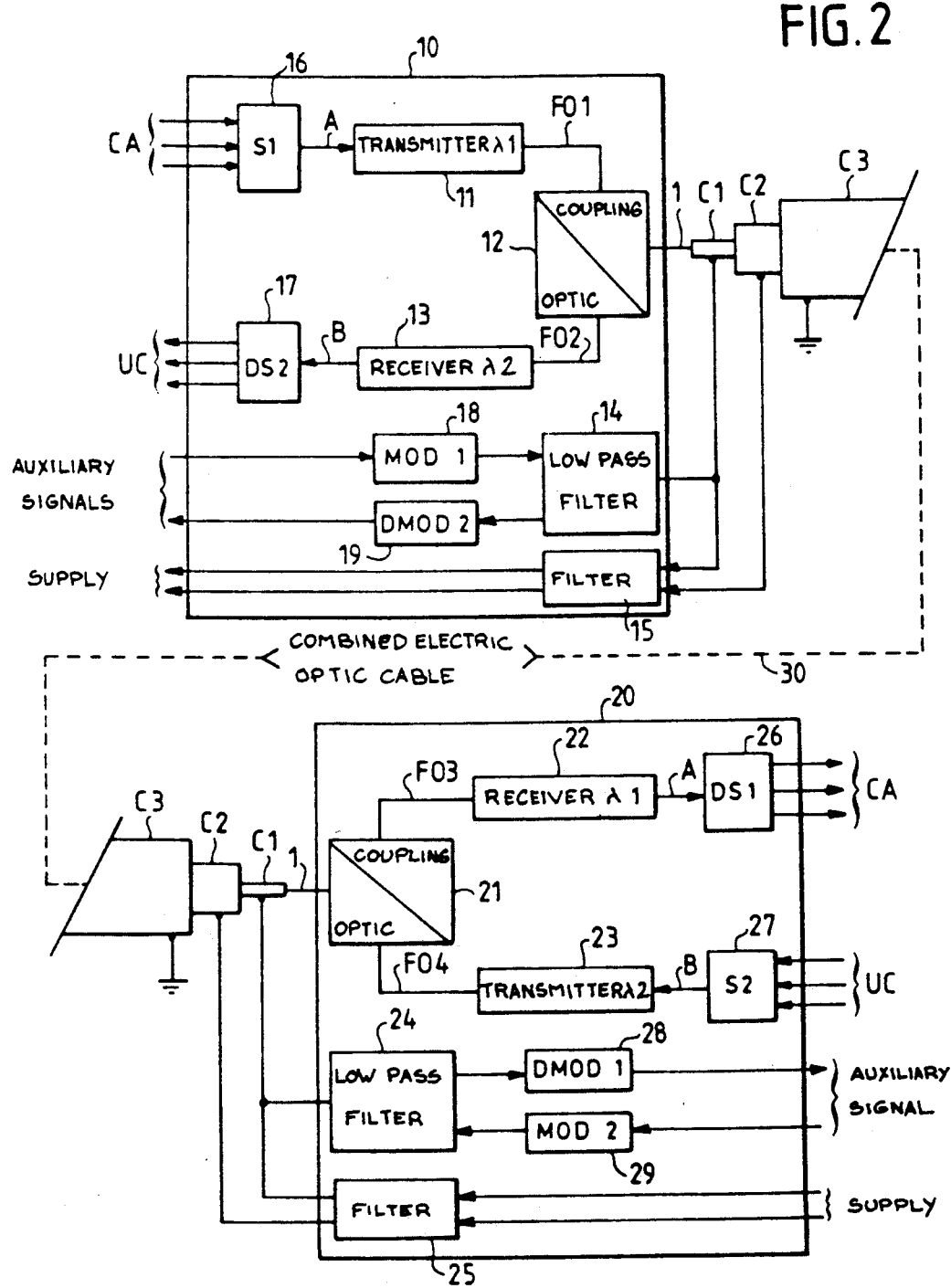
FIG. 2 shows a diagram of an application of the combined cable to the link between a camera head and a control unit, according to the invention.

FIG. 2 shows a diagram of an application of the combined electric/optic cable to the link between a camera head and a control unit.

The combined electric/optic cable may be used notably in equipment designed for professional television, for example to connect a camera head 10 and a control unit 20. The transmission of the signals between a camera head and a control unit should be bidirectional.

The signals to be transmitted from the camera to the control unit are:
the red, green and blue video signals, or else the luminance and chrominance signals, etc.;
the audio signals: interphone, commentator microphone, ambience sound microphone signals, etc.;
the service signals: remote control signals, recognition of type of camera, etc.;
the "back-up" signals: interphone signals.

The signals to be transmitted from the control unit towards the camera are:
the viewfinder return video signals, teleprompter signals etc.;
the audio signals: interphone signals, commentator sound signals, etc.;
the service signals: remote controls, servo-control etc.;
the "back-up" signals: interphones;
the supply to the camera head;
etc.

To transmit electrical signals, CA, such as video signals, coming from a camera head 10, these signals CA are first of all digitalized and serialized in a device S1, 16, and the resulting series signal A is received at the input of a transmitter 11, for example a laser that converts these electric signals A into light signals with a wavelength, $\lambda 1$. The light signal with a wavelength $\lambda 1$ at the output of the transmitter 11 is then transmitted, through an optic fiber F01 and an optic coupling device 12 towards the control unit 20, through the optic fiber 1 of the combined cable 30. In the control unit 20, the light signals with a wavelength $\lambda 1$ coming from the camera head 10 are transmitted by means of an optic coupling device 21 and an optic fiber F03, to a receiver 22, for example a photodiode that converts the light signals into electric signals in order to reconstitute, at the output of the receiver 22, the electric signals A which are then deserialized and converted into analog signals in a device DS1, 26, to reconstitute the signals SE.

In the same way, to transmit electrical signals UC from the control unit 20 to the camera head 10, these signals UC are first of all digitalized and serialized in a device S2, 27, and the resulting series signal B is received at the input of a transmitter, 23, for example a laser that converts the electric signals B into light signals with a wavelength $\lambda 2$. These light signals are then transmitted by means of an optic fiber F04 and the optic coupling device 21 to the camera head 10 through the optic fiber 1 of the combined cable 30. In the camera head 10, the light signals with a wavelength $\lambda 2$ coming from the control unit 20 are transmitted by means of an optic fiber F02 to a receiver 13, for example a photodiode, which converts them into electric signals, to reconstitute the electric signals B, which are then deserialized and converted into analog signals in a device DS2, 17, to reconstitute the signals UC.

The optic coupling devices 12 and 21 determine the direction of transmission of the light signals according to their wavelengths $\lambda 1$ and $\lambda 2$. The signals with a wavelength $\lambda 1$ are transmitted from the camera head 10 to the control unit 20 while the signals with a wavelength $\lambda 2$ are transmitted from the control unit 20 to the camera head 10. The optic coupling devices 12, 21 are, for example, multiplexer type couplers. The wavelengths $\lambda 1$ and $\lambda 2$ are, for example, equal to 1.3 $\mu$m and 1.55 $\mu$m respectively, and the optic fiber is preferably a monomode fiber.

The supply to the camera head 10 is controlled by the control unit 20. To this end, in the control unit 20, the supply signals are first of all filtered in a filter, 25, and transmitted to the camera head 10, through the conductors C1 and C2 of the combined cable 30. At reception, in the camera head 10, the supply signals coming from the control unit 20 are again filtered in a filter 15. The auxiliary signals, for example the back-up signals, are transmitted bidirectionally, through the conductor C1 of the combined cable 30, from the camera head to the control unit and from the control unit to the camera head after having been first of all modulated respectively in devices MOD1, 18, and MOD2, 19, and are filtered respectively in lowpass filters 14, 24. At reception, the auxiliary signals are reconstituted after having been filtered respectively in lowpass filters 24, 14 and demodulated respectively in devices DMOD1, 28, and DMOD2, 19.

The invention is not limited to the specifically described exemplary embodiments. In particular, it is not indispensable for the two internal conductors C1 and C2 to form an matched coaxial structure. Similarly, the number of conductors is not limited and it is possible to double or triple the conductors C1, C2 and C3 for applications that require this.

It is also possible to use two or more optic fibers positioned at the center of the triaxial structure. The use of two optic fibers makes it possible to do away with the need for optic coupling devices 12, 21 through the use of a different fiber in the two directions of transmission. When several fibers are used, this enables each signal to be transmitted in a different fiber, and does away with the need for the serialization devices S1, S2 and deserialization devices DS1, DS2.

In the specifically described exemplary application, the wavelengths $\lambda 1$ and $\lambda 2$ used at transmission and reception are different, but it is possible to use the same wavelength with a more complicated embodiment, without going beyond the scope of the invention.

Similarly, in the specifically described exemplary embodiment, the link between the camera head and the control unit is a digital link, the different signals transmitted in the optic fiber being digitalized beforehand. However, other types of links may be used, for example frequency modulation (FM) or pulse frequency modulation (PFM) links, without going beyond the scope of the invention.

What is claimed is:

1. A combined electrical/optic cable for the transmission of television signals, having a rotationally symmetrical structure and comprising, along one and the same central axis and protected by an external sheath, at least three imbricated, concentric, tubular electrical conductors C1, C2, C3, separated by insulator tubes, the conductor C3 being designed to be grounded, and at least one central optic fiber, with the same axis, designed to transmit video signals.

2. A cable according to claim 1, wherein the electrical conductors C1, C2, C3 constitute a triaxial structure, the two internal conductors C1, C2 having a matched coaxial structure and the third conductor being designed to be grounded.

3. A cable according to either the claims 1 and 2, wherein at least one of the conductors is formed by two conductive coaxial tubes in contact.

4. A cable according to claim 3, wherein said cable links a camera head and a control unit, and wherein the optic fiber is designed for the bidirectional transmission of the video signals between the camera head and the control unit, the conductors C1 and C2 are designed to transmit supply signals from the control unit to the camera head and to transmit auxiliary signals bidirectionally between the control unit and the camera head, and the conductor C3 is connector to ground.

5. A cable according to either of claims 1 or 2, wherein said cable links a camera head and a control unit, and wherein the optic fiber is designed for the bidirectional transmission of the video signals between the camera head and the control unit, the conductors C1 and C2 are designed to transmit supply signals from the control unit to the camera head and to transmit auxiliary signals bidirectionally between the control unit and the camera head, and the conductor C3 is connected to ground.

6. A combined electrical/optic cable for the transmission of television signals, having a rotationally symmetrical structure and comprising, along one and the same central axis and protected by an external sheath, at least three imbricated, concentric, tubular electrical conductors C1, C2, C3, separated by insulator tubes, the conductor C3 being designed to be grounded, and at least one central optic fiber, with the same axis, designed to transmit video signals;
   wherein said combined electro/optic cable links a camera head and control unit, and wherein the optic fiber is designed for the bidirectional transmission of the video signals between the camera head and the control unit, the conductors C1 and C2 are designed to transmit supply signals from the control unit to the camera head and to transmit auxiliary signals bidirectionally between the control unit and the camera head, and the conductor C3 is connected to ground; and
   wherein, for the bidirectional transmission of the video signals in the optic fiber, for each direction of transmission, these signals are first of all digitalized and serialized in a device respectively and then converted into light signals in a laser transmitter, with wavelengths of $\lambda 1$ and $\lambda 2$ respectively.

7. A combined electrical/optic cable for the transmission of television signals, having a rotationally symmetrical structure and comprising, along one and the same central axis and protected by an eternal sheath, at least three imbricated, concentric, tubular electrical conductors C1, C2, C3, separated by insulator tubes, the conductor C3 being designed to be grounded, and at least one central optic fiber, with the same axis, designed to transmit video signals;
   wherein said combined electro/optic cable links a camera head and control unit, and wherein the optic fiber is designed for the bidirectional transmission of the video signals between the camera head and the control unit, the conductors C1 and C2 are designed to transmit supply signals from the control unit to the camera head and to transmit auxiliary signals bidirectionally between the control unit and the camera head, and the conductor C3 is connected to ground;
   wherein, for the bidirectional transmission of the video signals in the optic fiber, for each direction of transmission, these signals are first of all digitalized and serialized in a device respectively and then converted into light signals in a laser transmitter, with wavelengths of $\lambda 1$ and $\lambda 2$ respectively; and
   wherein the wavelengths $\lambda 1$ and $\lambda 2$ are different and wherein the direction of transmission is selected by a coupling device according to the wavelengths, $\lambda 1$ and $\lambda 2$, said coupling device being placed between the laser transmitter and the optic fiber.

8. A combined electrical/optic cable for the transmission of television signals, having a rotationally symmetrical structure and comprising, along one and the same central axis and protected by an external sheath, at least three imbricated, concentric, tubular electrical conductors C1, C2, C3, separated by insulator tubes, the conductor C3 being designed to be grounded, and at least one central optic fiber, with the same axis, designed to transmit video signals, wherein at least one of the conductors is formed by two conductive coaxial tubes in contact;
   wherein said cable links a camera head and a control unit, and wherein the optic fiber is designed for the bidirectional transmission of the video signals between the camera head and the control unit, the conductors C1 and C2 are designed to transmit supply signals from the control unit to the camera head and to transmit auxiliary signals bidirectionally between the control unit and the camera head, and the conductor C3 is connected to ground; and
   wherein, for the bidirectional transmission of the video signals in the optic fiber, for each direction of transmission, these signals are first of all digitalized and serialized in a device respectively and then converted into light signals in a laser transmitter, with wavelengths of $\lambda 1$ and $\lambda 2$ respectively.

9. A combined electrical/optic cable for the transmission of television signals, having a rotationally symmetrical structure and comprising, along one and the same central axis and protected by an external sheath, at least three imbricated, concentric, tubular electrical conductors C1, C2, C3, separated by insulator tubes, the conductor C3 being designed to be grounded, and at least one central optic fiber, with the same axis, designed to transmit video signals, wherein at least one of the conductors is formed by two conductive coaxial tubes in contact;
   wherein said cable links a camera head and a control unit, and wherein the optic fiber is designed for the bidirectional transmission of the video signals between the camera head and the control unit, the conductors C1 and C2 are designed to transmit supply signals from the control unit to the camera head and to transmit auxiliary signals bidirectionally between the control unit and the camera head, and the conductor C3 is connected to ground;
   wherein, for the bidirectional transmission of the video signals in the optic fiber, for each direction of transmission, these signals are first of all digitalized and serialized in a device respectively and then converted into light signals in a laser transmitter, with wavelengths of $\lambda 1$ and $\lambda 2$ respectively; and
   wherein the wavelengths $\lambda 1$ and $\lambda 2$ are different and wherein the direction of transmission is selected by a coupling device according to the wavelengths, $\lambda 1$ and $\lambda 2$, said coupling device being placed between the laser transmitter and the optic fiber.

* * * * *